US008133315B2

(12) United States Patent
Endres et al.

(10) Patent No.: US 8,133,315 B2
(45) Date of Patent: Mar. 13, 2012

(54) CONSOLIDATING AGENT AND USE THEREOF FOR THE PRODUCTION OF HYDROLYSIS-STABLE MOLDED MEMBERS AND COATINGS

(75) Inventors: Klaus Endres, Homburg (DE); Bernd Reinhard, Merzig-Brotdorf (DE); Helmut Schmidt, Saarbruecken-Guedingen (DE)

(73) Assignee: Leibniz-Institut fuer Neue Materialien Gemeinnuetzige GmbH, Saarbruecken (DE)

( * ) Notice: Subject to any disclaimer, the term of this patent is extended or adjusted under 35 U.S.C. 154(b) by 403 days.

(21) Appl. No.: 11/721,201

(22) PCT Filed: Jan. 19, 2006

(86) PCT No.: PCT/EP2006/000464
§ 371 (c)(1),
(2), (4) Date: Aug. 8, 2007

(87) PCT Pub. No.: WO2006/077124
PCT Pub. Date: Jul. 27, 2006

(65) Prior Publication Data
US 2008/0125564 A1   May 29, 2008

(30) Foreign Application Priority Data
Jan. 20, 2005 (DE) .......................... 10 2005 002 788

(51) Int. Cl.
B28B 7/34 (2006.01)
C09D 183/04 (2006.01)
C08L 83/02 (2006.01)
C08G 77/00 (2006.01)

(52) U.S. Cl. .................. 106/38.2; 106/287.16; 524/588; 528/10

(58) Field of Classification Search .................... 523/139
See application file for complete search history.

(56) References Cited

U.S. PATENT DOCUMENTS

| | | | |
|---|---|---|---|
| 2,706,190 A * | 4/1955 | Clark ............................... 525/20 |
| 3,024,215 A * | 3/1962 | Freeman et al. ............... 521/122 |
| 3,258,382 A * | 6/1966 | Vincent .......................... 156/329 |
| 3,619,255 A * | 11/1971 | Lengnick ....................... 428/429 |
| 3,672,833 A * | 6/1972 | Teichner et al. ............... 423/338 |
| 3,806,491 A * | 4/1974 | Gardikes et al. .............. 523/144 |
| 4,177,317 A * | 12/1979 | Schoenafinger et al. ..... 428/405 |
| 4,243,692 A * | 1/1981 | Scholze et al. ............... 427/2.13 |
| 4,308,371 A | 12/1981 | Tanaka et al. |
| 4,366,187 A * | 12/1982 | Gabriel ......................... 427/96.6 |
| 4,374,696 A * | 2/1983 | Schmidt et al. ............... 156/329 |
| 4,386,134 A * | 5/1983 | Puhringer ...................... 428/447 |
| 4,417,623 A * | 11/1983 | Anthony ........................ 166/294 |
| 4,746,366 A * | 5/1988 | Philipp et al. ............ 106/287.19 |
| 4,766,949 A * | 8/1988 | Jhaveri et al. ................. 164/526 |
| 4,840,666 A * | 6/1989 | Schmidt et al. ............ 106/14.05 |
| 5,280,098 A * | 1/1994 | Witucki et al. ................. 528/17 |
| 5,365,995 A * | 11/1994 | Warner ........................... 164/12 |
| 5,731,091 A | 3/1998 | Schmidt et al. |
| 5,734,000 A | 3/1998 | Popall et al. |
| 5,746,992 A * | 5/1998 | Yoldas et al. .................. 423/338 |
| 5,766,680 A * | 6/1998 | Schmidt et al. ............... 427/226 |
| 5,858,280 A | 1/1999 | Zhang et al. |
| 5,917,075 A * | 6/1999 | Wolter ........................... 556/438 |
| 6,121,187 A * | 9/2000 | Maier ............................ 502/232 |
| 6,162,498 A * | 12/2000 | Mennig et al. ................ 427/226 |
| 6,287,639 B1 | 9/2001 | Schmidt et al. |
| 6,378,599 B1 | 4/2002 | Schmidt et al. |
| 6,432,191 B2 | 8/2002 | Schutt |
| 6,451,382 B2 | 9/2002 | Schutt et al. |
| 6,513,592 B2 | 2/2003 | Espin et al. |
| 6,555,236 B1 | 4/2003 | Nakamura et al. |
| 6,743,517 B2 * | 6/2004 | Nakamura et al. ............. 428/447 |
| 6,984,483 B1 * | 1/2006 | Roscher et al. ............. 430/280.1 |
| 7,825,074 B2 | 11/2010 | Schmidt et al. |
| 2001/0024719 A1 | 9/2001 | Lewis |
| 2001/0030038 A1 | 10/2001 | Schutt et al. |
| 2001/0032568 A1 | 10/2001 | Schutt et al. |
| 2001/0056141 A1 | 12/2001 | Schutt et al. |
| 2002/0102417 A1 | 8/2002 | Schutt et al. |
| 2007/0158070 A1 | 7/2007 | Endres et al. |
| 2008/0103067 A1 | 5/2008 | Schmidt et al. |
| 2009/0233818 A1 | 9/2009 | Schmidt et al. |

FOREIGN PATENT DOCUMENTS

| | | |
|---|---|---|
| DE | 38 36 815 | 7/1990 |
| EP | 0 075 962 A1 | 4/1983 |
| EP | 0 171 493 | 2/1986 |
| EP | 0 273 867 A2 | 7/1988 |
| JP | 60-190473 | 9/1985 |
| JP | 10-500072 A | 10/1986 |
| JP | 9-504768 A | 9/1997 |
| JP | 2001-72442 A | 3/2001 |
| JP | 2002-275418 A | 9/2002 |
| JP | 2004-521988 A | 7/2004 |

OTHER PUBLICATIONS

An English language abstract of DE 38 36 815.
English language abstract of EP 0 273 867 A2, 1988.
English language abstract of EP 0 075 962 A1, 1983.

* cited by examiner

Primary Examiner — Robert Loewe
(74) Attorney, Agent, or Firm — Abel Law Group, LLP

(57) ABSTRACT

Described is a consolidant comprising a hydrolyzate or pre-condensate of at least one organosilane and at least one metal compound, where the molar ratio of silicon compounds to metal compounds is in the range of from 10 000:1 to 10:1. The consolidant can be used for the hydrolysis-stable consolidation of porous or particulate materials to form moldings. The consolidant can be used for the hydrolysis-stable coating of substrates.

19 Claims, No Drawings

CONSOLIDATING AGENT AND USE THEREOF FOR THE PRODUCTION OF HYDROLYSIS-STABLE MOLDED MEMBERS AND COATINGS

CROSS-REFERENCE TO RELATED APPLICATIONS

The present application is a U.S. National Stage of International Application No. PCT/EP2006/000464, filed Jan. 19, 2006, which claims priority of German Patent Application No. 10 2005 002 788.1, filed Jan. 20, 2005.

BACKGROUND OF THE INVENTION

1. Field of the Invention

The invention relates to a consolidant and to its use for producing hydrolytically and hydrothermally stable molded articles and coatings, and to the products formed therefrom.

2. Discussion of Background Information

Binders are of high significance especially for the binding of compact or particulate products in order to produce moldings therefrom. A particular problem in this context is the hydrolysis stability of consolidants when they are exposed to aggressive conditions. This is because, for an efficient use of binders, it is important that the stability is maintained for as long as possible even under aggressive conditions such as high pressures, high temperatures, contact with aqueous or corrosive media such as acids or bases, and the bond strength must not be reduced significantly. In this regard, organic polymers as binders are frequently of inadequate stability.

The production of composite materials from particulate systems with suitable binders is also difficult when the composite materials are to lose only a little porosity compared to the binder-free product. For example, it is possible with organic polymer binders to produce porous composites, but it is found that it is barely possible to maintain the original porosity. In the case of reduced binder use, it is possible to produce porous systems, but such composites are unsuitable for many applications, especially at elevated temperatures and in the environment of organic liquids owing to the property of the organic polymers to swell up or go into solution in the presence of organic solvents.

The use of purely inorganic binders which are obtainable, for example, via the sol-gel process does lead to a bond in which an appropriate porosity is maintained in the consolidated molding body, but the bonded system is very brittle, fragile and not sufficiently resistant to mechanical stresses such as shear stresses or high pressure stresses.

Moreover, it is frequently appropriate to produce moldings under the conditions under which they are also employed later. It is therefore frequently desirable to cure the consolidated moldings under an elevated pressure. This is completely impossible for many consolidants.

It was an object of the invention to provide a process for producing consolidated moldings and coatings which are in particular hydrolysis-stable and hydrothermally stable even under corrosive conditions. Retention of a desired porosity should also be possible. Moreover, a good bond strength with sufficient flexibility should be achieved. It was also desired to enable consolidation under hydrothermal conditions, i.e. under elevated pressure and elevated temperature.

The object is achieved by the provision of a consolidant for producing hydrolysis-stable molding bodies or coatings, comprising a hydrolyzate or precondensate of
(a) at least one organosilane of the general formula (I)

$$R_nSiX_{4-n} \qquad (I)$$

in which the R radicals are the same or different and are groups not eliminable by hydrolysis, the X radicals are the same or different and are groups eliminable by hydrolysis or hydroxyl groups, and n is 1, 2 or 3,
(b) at least one hydrolyzable silane of the general formula (II)

$$SiX_4 \qquad (II)$$

in which the X radicals are each as defined above; and
(c) at least one metal compound of the general formula (III)

$$MX_a \qquad (III)$$

in which M is a metal of main groups I to VIII or of transition groups II to VIII of the Periodic Table of the Elements including boron, X is as defined in formula (I), where two X groups may be replaced by one, oxo group, and a corresponds to the valency of the element; where the molar ratio of silicon compounds used to metal compounds used is in the range from 10 000:1 to 10:1.

SUMMARY OF THE INVENTION

The present invention provides a consolidant for the production of hydrolysis-stable molded articles and coatings. The consolidant comprises a hydrolyzate and/or a precondensate of
(a) at least one organosilane of formula $$R_nSiX_{4-n} \qquad (I)$$

wherein the radicals R are the same or different and represent groups which are not removable by hydrolysis, the radicals X are the same or different and represent hydroxy groups and groups which are removable by hydrolysis, and n is 1, 2 or 3;
(b) at least one hydrolysable silane of formula $$SiX_4 \qquad (II)$$

wherein the radicals X are as defined above; and
(c) at least one metal compound of formula $$MX_a \qquad (III)$$

wherein M represents a metal of main groups I to VIII or of transition groups II to VIII of the Periodic System of Elements, including boron, X is as defined above in formula (I), with the proviso that two radicals X may be replaced by one oxo group, and a corresponds to a valency of the metal M;

Further, the molar ratio of the compounds of formulae (I) and (II) to compound(s) of formula (III) is from 10,000:1 to 10:1.

In one aspect of the consolidant, M in formula (III) may comprise at least one of B, Al, Zr and Ti. For example, M may comprise Ti.

In another aspect, the at least one compound of formula (II) may comprise tetraethoxysilane.

In another aspect, the molar ratio of the compounds of formulae (I) and (II) to compound(s) of formula (III) may be from 2,000:1 to 20:1, e.g., from 2,000:1 to 200:1.

In yet another aspect, the at least one compound of formula (I) may comprise at least one alkylsilane and at least one arylsilane and/or the at least one compound of formula (II) may comprise at least one orthosilicic ester and/or the at least one compound of formula (III) may comprise at least one metal alkoxylate.

In a still further aspect, the consolidant may have been prepared by the sol-gel process using a sub-stoichiometric amount of water based on the hydrolysable groups present.

In another aspect, the consolidant of the present invention may be present in a substantially particle-free form. For example, it may be present as a solution and/or as an emulsion.

In another aspect, the consolidant may further comprise a solvent and/or an additive.

The present invention also provides a consolidant for the production of hydrolysis-stable molded articles and coatings, which consolidant comprises a hydrolyzate and/or a precondensate of (a) at least one organosilane of formula $$R_nSiX_{4-n} \quad (I)$$

wherein the radicals R are the same or different, represent groups which are not removable by hydrolysis and comprise at least one of an alkyl group having from 1 to 4 carbon atoms and an aryl group, the radicals X are the same or different and represent hydroxy groups and groups which are removable by hydrolysis, and n is 1, 2 or 3;

(b) at least one hydrolysable silane of formula $$SiX_4 \quad (II)$$

wherein the radicals X are as defined above; and (c) at least one metal compound of formula $$MX_a \quad (III)$$

wherein M represents at least one of B, Al, Zr and Ti, X is as defined above in formula (I), with the proviso that two radicals X may be replaced by one oxo group, and a corresponds to the valency of M.

Further, the molar ratio of compounds of formulae (I) and (II) to compound(s) of formula (III) is from 2,000:1 to 20:1.

In one aspect of the consolidant, M in formula (III) may comprise Ti, and the molar ratio of the compounds of formulae (I) and (II) to compound(s) of formula (III) may be from 2,000:1 to 200:1.

In another aspect, the at least one compound of formula (I) may comprise at least one alkylsilane and at least one arylsilane, the at least one compound of formula (II) may comprise at least one orthosilicic ester and the at least one compound of formula (III) may comprise at least one metal alkoxylate.

The present invention also provides a process for producing a hydrolysis-stable molded article. The process comprises mixing the consolidant of the present invention as set forth above, including the various aspects thereof, with a porous and/or particulate material and curing the consolidant.

In one aspect of the process, the consolidant may be cured under elevated pressure and at elevated temperature, for example, at a temperature of at least 40° C. and a pressure of at least 5 bar.

In another aspect, the at least one porous and/or particulate material may comprise at least one of a metal, a non-metal, glass, ceramic, carbon, an oxide, a nitride, a carbide, a boride, a mineral, a plastic material, plastic fibers, glass fibers, mineral fibers, natural fibers and wood fibers.

In yet another aspect, before and/or during the curing a liquid and/or a gaseous medium, for example, air, may be passed for a predetermined period through a molding body to be consolidated which is mixed with the consolidant in order to adjust the porosity of the molded body.

The present invention also provides a hydrolysis-stable molded article which is obtainable by the above process and/or which comprises the cured consolidant of the present invention.

The present invention also provides a process for the production of a hydrolysis-stable consolidated coating. The process comprises applying the consolidant of the present invention as set forth above, including the various aspects thereof, to a substrate as a coating material and curing the consolidant.

In one aspect of the process, the consolidant may be cured under elevated pressure and at elevated temperature.

In another aspect, the consolidant may be mixed with a porous and/or particulate material to be consolidated before being applied to the substrate.

The present invention also provides a hydrolysis-stable coating which is obtainable by the above process and/or which comprises the cured consolidant of the present invention.

The present invention also provides a brake lining and a hydrolysis-stable, chemical-resistant reactor lining which comprise the cured consolidant of the present invention.

The present invention also provides a storage system for hydrogen or other fuels and a storage system for phase-changing solids which comprise the cured consolidant of the present invention.

The use of hydrolyzable metal compounds of the formula (III) surprisingly brings two advantages: in the case of consolidants which comprise these metal compounds, a particularly good hydrolysis stability and hydrothermal stability of the cured consolidants was found in comparison to those without this metal compound, even under aggressive conditions such as elevated temperature and elevated pressure and contact with aggressive aqueous media. Even long-term uses under corrosive hydrothermal stress are thus possible. A further advantage consists in the fact that consolidants which comprise such metals can be cured even under elevated pressure.

Suitable examples of hydrolytically eliminable groups X of the above formulae are hydrogen, halogen (F, Cl, Br or I, especially Cl or Br), alkoxy (e.g. $C_{1-6}$-alkoxy, for example methoxy, ethoxy, n-propoxy, i-propoxy, and n-, i-, sec- or tert-butoxy), aryloxy (preferably $C_{6-10}$-aryloxy, for example phenoxy), alkaryloxy, e.g. benzoyloxy, acyloxy (e.g. $C_{1-6}$-acyloxy, preferably $C_{1-4}$-acyloxy, for example acetoxy or propionyloxy) and alkylcarbonyl (e.g. $C_{2-7}$-alkylcarbonyl such as acetyl). Likewise suitable are $NH_2$, mono- or dialkyl-, -aryl- and/or -aralkyl-substituted amino, examples of the alkyl, aryl and/or aralkyl radicals being those specified above for R, amido such as benzoamido or aldoxime or ketoxime groups. Two or three X groups may also be bonded to one another, for example in the case of Si-polyol complexes with glycol, glycerol or pyrocatechol. The groups mentioned may optionally contain substituents such as halogen, hydroxyl, alkoxy, amino or epoxy.

Preferred hydrolytically eliminable X radicals are halogen, alkoxy groups and acyloxy groups. Particularly preferred hydrolytically eliminable radicals are $C_{2-4}$-alkoxy groups, especially ethoxy.

The hydrolytically noneliminable R radicals of the formula (I) are, for example, alkyl (e.g. $C_{1-20}$-alkyl, especially $C_{1-4}$-alkyl, such as methyl, ethyl, n-propyl, i-propyl, n-butyl, i-butyl, sec-butyl and tert-butyl), alkenyl (e.g. $C_{2-20}$-alkenyl, especially $C_{2-4}$-alkenyl such as vinyl, 1-propenyl, 2-propenyl and butenyl), alkynyl (e.g. $C_{2-20}$-alkynyl, especially $C_{2-4}$-alkynyl such as ethynyl or propargyl), aryl (especially $C_{6-10}$-aryl such as phenyl and naphthyl) and corresponding aralkyl and alkaryl groups such as tolyl and benzyl, and cyclic $C_3$-$C_{12}$-alkyl and -alkenyl groups such as cyclopropyl, cyclopentyl and cyclohexyl.

The R radicals may have customary substituents which may be functional groups, through which crosslinking of the condensate via organic groups is also possible if required. Typical substituents are, for example, halogen (e.g. chlorine or fluorine), epoxide (e.g. glycidyl or glycidyloxy), hydroxyl, ether, ester, amino, monoalkylamino, dialkylamino, optionally substituted anilino, amide, carboxyl, alkenyl, alkynyl, acryloyl, acryloyloxy, methacryloyl, methacryloyloxy, mercapto, cyano, alkoxy, isocyanato, aldehyde, keto, alkylcarbonyl, acid anhydride and phosphoric acid. These substituents are bonded to the silicon atom via divalent bridging groups, especially alkylene, alkenylene or arylene bridging groups, which may be interrupted by oxygen or —NH— groups. The bridging groups contain, for example, from 1 to 18, preferably from 1 to 8 and in particular from 1 to 6 carbon atoms. The divalent bridging groups mentioned derive, for example, from the abovementioned monovalent alkyl, alkenyl or aryl radicals. Of course, the R radical may also have more than one functional group.

Preferred examples of hydrolytically noneliminable R radicals with functional groups through which cross-linking is possible are a glycidyl- or glycidyloxy($C_{1-20}$)-alkylene radical such as β-glycidyloxyethyl, γ-glycidyloxypropyl, δ-glycidyloxybutyl, ε-glycidyloxypentyl, ω-glycidyloxyhexyl, and 2-(3,4-epoxycyclohexyl)ethyl, a (meth)acryloyloxy-($C_{1-6}$)-alkylene radical, e.g. (meth)acryloyloxymethyl, (meth)acryloyloxyethyl, (meth)acryloyloxypropyl or (meth)acryloyloxy-butyl, and a 3-isocyanotopropyl radical. Particularly preferred radicals are γ-glycidyloxypropyl and (meth)acryloyloxypropyl. In this context, (meth)acryloyl represents acryloyl and methacryloyl.

Preferred R radicals which are used are radicals without substituents or functional groups, especially alkyl groups, preferably having from 1 to 4 carbon atoms, especially methyl and ethyl, and also aryl radicals such as phenyl.

Examples of organosilanes of the general formula (I) are compounds of the following formulae, particular preference being given to the alkylsilanes and especially methyltriethoxysilane:

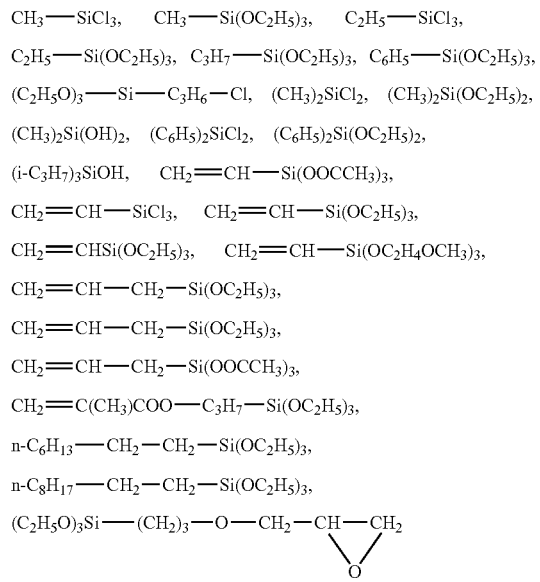

Examples of the hydrolyzable silanes of the general formula (II) are $Si(OCH_3)_4$, $Si(OC_2H_5)_4$, $Si(O$-n- or i-$C_3H_7)_4$, $Si(OC_4H_9)_4$, $SiCl_4$, $HSiCl_3$, $Si(OOCCH_3)_4$. Among these hydrolyzable silanes, tetraethoxysilane is particularly preferred.

The silanes can be prepared by known methods; cf. W. Noll, "Chemie und Technologie der Silicone" [Chemistry and technology of the silicones], Verlag Chemie GmbH, Weinheim/Bergstraβe (1968).

In the metal compound of the general formula (III)

$$MX_a \qquad (III)$$

M is a metal of main groups I to VIII or of transition groups II to VIII of the Periodic Table of the Elements including boron, X is as defined in formula (I), where two X groups may be replaced by one oxo group, and a corresponds to the valency of the element.

M is different from Si. Here, boron is also counted among the metals. Examples of such metal compounds are compounds of glass- or ceramic-forming elements, especially compounds of at least one element M from main groups III to V and/or transition groups II to IV of the Periodic Table of the Elements. The compounds are preferably hydrolyzable compounds of Al, B, Sn, Ti, Zr, V or Zn, especially those of Al, Ti or Zr, or mixtures of two or more of these elements. It is likewise possible to use, for example, hydrolyzable compounds of elements of main groups I and II of the Periodic Table (e.g. Na, K, Ca and Mg) and of transition groups V to VIII of the Periodic Table (e.g. Mn, Cr, Fe and Ni). It is also possible to use hydrolyzable compounds of the lanthanoids, such as Ce. Preference is given to metal compounds of the elements B, Ti, Zr and Al, particular preference being given to Ti.

Preferred metal compounds are, for example, the alkoxides of B, Al, Zr and especially Ti. Suitable hydrolyzable metal compounds are, for example, $Al(OCH_3)_3$, $Al(OC_2H_5)_3$, $Al(O$-n-$C_3H_7)_3$, $Al(O$-i-$C_3H_7)_3$, $Al(O$-n-$C_4H_9)_3$, $Al(O$-sec-$C_4H_9)_3$, $AlCl_3$, $AlCl(OH)_2$, $Al(OC_2H_4OC_4H_9)_3$, $TiCl_4$, $Ti(OC_2H_5)_4$, $Ti(O$-n-$C_3H_7)_4$, $Ti(O$-i-$C_3H_7)_4$, $Ti(OC_4H_9)_4$, $Ti(2$-ethylhexoxy$)_4$, $ZrCl_4$, $Zr(OC_2H_5)_4$, $Zr(O$-n-$C_3H_7)_4$, $Zr(O$-i-$C_3H_7)_4$, $Zr(OC_4H_9)_4$, $ZrOCl_2$, $Zr(2$-ethylhexoxy$)_4$, and also Zr compounds which have complexing radicals, for example β-diketone and (meth)acryloyl radicals, sodium ethoxide, potassium acetate, boric acid, $BCl_3$, $B(OCH_3)_3$, $B(OC_2H_5)_3$, $SnCl_4$, $Cn(OCH_3)_4$, $Sn(OC_2H_5)_4$, $VOCl_3$ and $VO(OCH_3)_3$.

In a particularly preferred embodiment, the consolidant is prepared using an alkylsilane such as methyltriethoxysilane (MTEOS), an arylsilane such as phenyltriethoxysilane, an orthosilicic ester such as tetraethoxysilane (TEOS) and a metal compound of the formula (III), particular preference being given to the use of a metal compound of B, Al, Zr and especially Ti.

To prepare the consolidant, preferably at least 50 mol %, more preferably at least 70 mol % and in particular at least 80 mol % of organosilanes of the formula (I) with at least one hydrolytically noneliminable group are used. The rest comprises hydrolyzable compounds, especially the hydrolyzable silanes of the formula (II) which do not have any hydrolytically noneliminable groups, and the metal compounds of the formula (III).

The molar ratio of silicon compounds of the formulae (I) and (II) used to metal compounds of the formula (III) used is in the range from 10 000:1 to 10:1, particularly good hydrolysis stability being achieved within the range from 2000:1 to 20:1 and more preferably from 2000:1 to 200:1.

For the calculation of the molar proportions and ratios which are specified above, the starting points for the compounds in each case are the monomeric compounds. When, as explained below, already precondensed compounds (dimers, etc.) are used as starting materials, there should be a conversion to the corresponding monomers.

The hydrolyzates or precondensates of the consolidant are obtained from the hydrolyzable silanes and the hydrolyzable metal compounds by hydrolysis and condensation. Hydrolyzates or precondensates are understood to mean especially hydrolyzed or at least partially condensed compounds of the hydrolyzable starting compounds. Instead of the hydrolyzable monomer compounds, it is also possible to use already precondensed compounds. Such oligomers which are preferably soluble in the reaction medium may, for example, be straight-chain or cyclic low molecular weight part-condensates (for example polyorganosiloxanes) having a degree of condensation of, for example, from about 2 to 100, especially from about 2 to 6.

The hydrolyzates or precondensates are obtained by hydrolysis and condensation of the hydrolyzable starting compounds by the sol-gel process. In the sol-gel process, the hydrolyzable compounds are hydrolyzed with water, optionally in the presence of acidic or basic catalysis, and at least partly condensed. Preference is given to effecting the hydrolysis and condensation in the presence of acidic condensation catalysts (e.g. hydrochloric acid, phosphoric acid or formic acid) at a pH of preferably from 1 to 3. The sol which forms can be adjusted to the viscosity desired for the consolidant by suitable parameters, for example degree of condensation, solvent or pH.

Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

For the hydrolysis and condensation, it is possible to use stoichiometric amounts of water, but also smaller or larger amounts. Preference is given to employing a substoichiometric amount of water based on the hydrolyzable groups present. The amount of water used for the hydrolysis and condensation of the hydrolyzable compounds is preferably from 0.1 to 0.9 mol and more preferably from 0.25 to 0.75 mol of water per mole of hydrolyzable groups present. Often, particularly good results are achieved with less than 0.7 mol of water, especially from 0.65 to 0.75 mol of water, per mole of hydrolyzable groups present.

The consolidant used in accordance with the invention is in particular present in particle-free form as solution or emulsion. Before use, the consolidant can be activated by adding a further amount of water.

The consolidant may comprise conventional additives and solvents such as water, alcohols, preferably lower aliphatic alcohols ($C_1$-$C_8$-alcohols), such as methanol, ethanol, 1-propanol, isopropanol and 1-butanol, ketones, preferably lower dialkyl ketones such as acetone and methyl isobutyl ketone, ethers, preferably lower dialkyl ethers such as diethyl ether, or monoethers of diols such as ethylene glycol or propylene glycol with $C_1$-$C_8$-alcohols, amides such as dimethylformamide, tetrahydrofuran, dioxane, sulfoxides, sulfones or butylglycol, and mixtures thereof. Preference is given to using water and alcohols. It is also possible to use high-boiling solvents, for example polyethers such as triethylene glycol, diethylene glycol diethyl ether and tetraethylene glycol dimethyl ether. In some cases, other solvents also find use, for example light paraffins (petroleum ether, alkanes and cycloalkanes), aromatics, heteroaromatics and halogenated hydrocarbons. It is also possible for dicarboxylic esters such as dimethyl succinate, dimethyl adipate, dimethyl glutarate and mixtures thereof to find use, and also the cyclic carboxylic esters, for example propylene carbonate and glyceryl carbonate.

Other conventional additives are, for example, dyes, pigments, viscosity regulators and surfactants. For the preparation of emulsions of the consolidant, the emulsifiers which typically stabilize silicone emulsions, for example Tween® 80 and Brij® 30, may be employed.

The inventive consolidant is suitable for consolidating any organic or inorganic solids of pulverulent, granular, pellet, fibrous or similar particulate form. The particles may, for example, be particles of sub-µm size or else particles in the mm range and higher. Other usable solids are, for example, hollow glass microspheres or fibers, as employed, for example, for the production of brake linings. It is possible to use either natural materials which may, for example, be of mineral nature, or metals, or, for example, synthetic moldings formed from ultrafine metal powders, from ceramic powders, from glass or from combinations of the two, for example glass ceramic or cermets. The particulate or porous material to be consolidated is preferably selected from metals, nonmetals, glass, ceramic, carbon, oxides, nitrides, carbides, borides, minerals, plastics, plastics fibers, glass fibers, mineral fibers, natural fibers and wood materials. Suitable materials are, for example, pearlite, glass spheres, rock flour, metal powder, graphite, petroleum coke, steel wool, vermiculite, short fibers or pigments, for example $TiO_2$. The moldings produced may, for example, be pressings or castings.

To produce consolidated moldings, the consolidant is mixed with the porous or particulate material to be consolidated, for example by stirring-in, mixing or pumping-in, and then the consolidant mixed with the porous or particulate material is cured. The actual consolidation (curing) can be effected, for example, thermally by supplying heat. Another type of curing is the supply of condensation catalysts which catalyze crosslinking of the inorganically crosslinkable SiOH groups or metal-OH groups to form an inorganic network. Condensation catalysts suitable for this purpose are, for example, bases, but also fluoride ions or alkoxides. When starting compounds with polymerizable or polycondensable groups are used, for example methacryloyloxy or epoxide groups, the polymerization, polyaddition or polycondensation process can be initiated by adding thermal initiators or free-radical initiators.

In a preferred embodiment, the consolidation (curing) can be effected under elevated temperature and elevated pressure based on standard conditions, i.e. the pressure is greater than 1 bar and the temperature is higher than 20° C. The consolidant can also be cured at a temperature of at least 40° C. and a pressure of at least 5 bar. Curing can also be undertaken up to temperatures of 200° C. and pressures of up to 500 bar.

It is known that thermal curing of consolidants under ambient pressure is quite unproblematic. The continuous removal of the solvent and of the reaction product water from the mixture of binder sol and material to be consolidated results in an advancing condensation reaction. In the further thermal curing process, the consolidant is compacted on the material to be solidified.

The properties of consolidated materials depend, however, also on the conditions under which they are produced. In general, an improved performance of the consolidated materials is obtained when they are produced under about the same conditions as those in which they are to be used. For uses of consolidated materials at elevated pressures and temperatures, it is therefore desirable also to perform the production under about the same conditions. However, this is problematic for the prior art consolidants, since, in the case of curing of prior art consolidants at elevated pressure and elevated temperature, i.e. under hydrothermal conditions, solvents and reaction products remain in the system and merely enable a shift in the equilibrium. However, the equilibrium position under these conditions does not afford solidified or consolidated materials.

It has been found that, surprisingly, the equilibrium position is altered by the use of the metal compounds of the formula (III) such that setting of the consolidant used became possible under hydrothermal conditions (elevated pressure and elevated temperature). In this way, consolidated moldings or coatings can be obtained under hydrothermal conditions, and the consolidated moldings and coatings have good bond strengths with sufficient flexibility.

The curing of the consolidant under hydrothermal conditions can also be promoted by adding anhydrides to the consolidant. With the aid of the anhydrides, it is possible to scavenge condensation products such as water and ethanol. The anhydrides are preferably anhydrides of organic acids or mixtures of these anhydrides. Examples are acetic anhydride, methylnadic anhydride, phthalic anhydride, succinic anhydride and mixtures thereof.

In the case of addition of anhydrides, preference is given to using, for example, cyclic carbonic esters such as propylene carbonate, or dicarboxylic esters such as dimethyl glutarate, dimethyl adipate and dimethyl succinate, or dimethyl dicarbonate mixtures of the esters mentioned, as solvents. In general, the suitable solvent can, for this purpose, be exchanged completely or partly for the solvent used or formed in the preparation of the consolidant. In addition to the solvent exchange, it is also possible to use a preferred solvent actually in the preparation of the consolidant.

The curing of moldings to be consolidated is thus possible under hydrothermal conditions.

Since a compaction process of the gelled consolidant is prevented partly or completely under hydrothermal conditions, the consolidant gel can close the pores over a large volume. When a porous molding is to be obtained, this can preferably be achieved by passing a solid or liquid medium into the molding to be consolidated, which is mixed with the consolidant. This allows the porosity to be adjusted in the manner desired. The introduction is effected over a particular period especially before or during the curing operation.

Parameters for the pumping-through, such as duration, time, amount or flow rate of the liquid or gaseous phase, can be selected in a suitable manner immediately by the person skilled in the art in order to establish the desired porosity. The introduction can be effected, for example, before or after partial curing, in which case complete curing is effected after and/or during the introduction. For the introduction of a liquid or gaseous medium, it is possible, for example, to pump in an inert solvent or gas, for example $N_2$, $CO_2$ or air, which purges free the pore volumes and removes reaction products. As examples of solvents for the liquid medium, reference can be made to the statements above. The liquid or gaseous medium may optionally comprise catalysts and/or gas-releasing components or be laden with them. The gaseous or liquid media which are passed through the molding or the coating may, for example, be laden with a curing catalyst, so that it is fed to the molding to be cured. The catalyst is preferably volatile, gaseous or evaporable, may comprise dissolved substances, for example zirconium oxychloride, and be metered into the binder in the form of a gradient.

Porous consolidated moldings may have, for example, a degree of porosity (ratio of volume of the pores to the total volume of the molding) of from 5 to 50%. Of course, it is also possible to obtain essentially nonporous moldings.

Owing to its chemical constitution, the inventive consolidant enables rapid and effective solidification. In this connection, the use of phenylsilane alkoxides has been found to be particularly useful. This is suspected to be because these compounds, owing to the steric hindrance of the phenyl group and the electronic effects, have OH groups which do not react rapidly and bond particularly efficiently to the surface of inorganic materials.

Investigations have found that the moldings produced in accordance with the invention, even in an autoclave at high pressure and high temperature, are not degraded even over a prolonged period and also still form a stable bond under these conditions. The porosity too is reduced only to a slight degree, if at all.

In addition to the production of moldings, the consolidant can also be used as a coating composition. It can be applied as it is in any customary manner to a substrate and then cured in a customary manner. The curing can be effected in accordance with the statements for the molding body. It is possible to use all customary substrates, for example glass, metal, ceramic, bricks, cement or other building materials or wood. It is also possible to use a consolidation material mixed with the porous or particulate materials illustrated above as a coating composition, so as to obtain a composite coating.

The inventive consolidated moldings and coated substrates can be used, for example, as a hydrolysis-stable, chemical-resistant lining of reactors, as a storage system for hydrogen or other fuels, or as a storage system for phase-changing solids. Another field of use is the production of brake linings.

The examples which follow illustrate the invention.

EXAMPLES

Preparation of particle-free consolidants and their use for producing hydrolysis-resistant moldings and layers:

a) Consolidant $MTTi_{0.1}$—$TiOSO_4MT$ 04

52.4 g of MTEOS, 15.28 g of TEOS and 0.174 g of titanium tetraisopropoxide were mixed and reacted with vigorous stirring with 0.285 g of titanium oxosulfate-sulfuric acid complex which had been dissolved beforehand in 16.81 g of deionized water. After the changeover point, the reaction medium exceeded a temperature maximum of 69° C. After the reaction mixture had been cooled to 54° C., a further silane mixture which consisted of 52.4 g of MTEOS and 15.28 g of TEOS was added to the mixture which was stirred for another 5 minutes. After standing overnight, the binder is suitable for further processing. The pH can be adjusted within the range between pH 0 and 7 according to requirements.

To this end, for example, 225 g of a mixture of graphite, petroleum coke, steel wool and vermiculite were mixed with 100 g of the above binder which had been activated beforehand by adding 5 g of deionized water, filled into a compression mold (10×10×1 cm³) and compacted in a hot press at a pressure of 20 MPa, and cured at 70° C. within the first 15 minutes and at 120° C. for a further 15 minutes. After the demolding, the curing of the moldings was continued at 120° C. overnight. The resulting moldings exhibited shear strengths in the range from 350 to 500 N/cm².

b) Consolidant $MTTi_{0.1}P_3$ 06

26.2 g of MTEOS, 7.64 g of TEOS and 0.087 g of titanium tetraisopropoxide were mixed, and reacted with vigorous stirring with 12.63 g of deionized water and 0.088 ml of concentrated hydrochloric acid (37%). After the changeover point, the reaction mixture exceeded a temperature maximum of 62° C. After the reaction mixture had been cooled to 47° C., a further silane mixture which consisted of 26.45 g of phenyl-triethoxysilane, 6.54 g of MTEOS and 7.64 g of TEOS was added to the mixture which was stirred further for another 5 minutes. After standing overnight, the binder is suitable for further processing. The pH can be adjusted within the range between pH 0 and 7 according to requirements.

17 g of the above binder were added to 9 g of TiO$_2$ pigment (DuPont R 931). The mixture is homogenized by means of an Ultraturrax and applied by means of spin-coating to substrates of stainless steel or glass. The layer was dried initially at 70° C. for 30 min. This was followed by firing at 500° C. for 10 min. The layer is found to be exceptionally hydrolysis-stable after storage in 0.1 N NaOH solution for 16 hours.

What is claimed is:

1. A process for producing a hydrolysis-stable molded article, wherein the process comprises mixing a pre-formed consolidant with at least one of a porous material and a particulate material and curing the consolidant, wherein the consolidant is particle-free and comprises at least one of a hydrolyzate and a precondensate of (a) at least one organosilane of formula $$R_nSiX_{4-n} \quad (I)$$

wherein the radicals R are the same or different and represent groups which are not removable by hydrolysis, the radicals X are the same or different and represent hydroxy groups and groups which are removable by hydrolysis, and n is 1, 2 or 3;

(b) at least one hydrolysable silane of formula $$SiX_4 \quad (II)$$

wherein the radicals X are as defined above; and
(c) at least one metal compound of formula $$MX_a \quad (III)$$

wherein M represents a metal of main groups I to VIII or of transition groups II to VIII of the Periodic System of Elements, including boron, X is as defined above in formula (I), with the proviso that two radicals X may be replaced by one oxo group, and a corresponds to a valency of the metal M;

and wherein a molar ratio of compounds of formulae (I) and (II) to compound(s) of formula (III) is from 10,000:1 to 10:1.

2. The process of claim 1, wherein the consolidant is cured at a temperature of at least 40° C. and a pressure of at least 5 bar.

3. The process of claim 1, wherein the at least one of a porous material and a particulate material comprises at least one of a metal, a non-metal, glass, ceramic, carbon, an oxide, a nitride, a carbide, a boride, a mineral, a plastic material, plastic fibers, glass fibers, mineral fibers, natural fibers and wood fibers.

4. The process of claim 1, wherein at least one of before and during curing at least one of a liquid or gaseous medium is passed for a predetermined period through a molding body to be consolidated which is mixed with the consolidant in order to adjust a porosity of the molded body.

5. The process of claim 4, wherein the at least one of a liquid or gaseous medium comprises air.

6. The process of claim 1, wherein M in formula (III) comprises at least one of B, Al, Zr, Sn, V, and Zn.

7. The process of claim 1, wherein M in formula (III) comprises Ti.

8. The process of claim 1, wherein the molar ratio of compounds of formulae (I) and (II) to compound(s) of formula (III) is from 2,000:1 to 20:1.

9. The process of claim 1, wherein the at least one compound of formula (I) comprises at least one alkylsilane and at least one arylsilane.

10. The process of claim 1, wherein the pre-formed consolidant has been prepared by a sol-gel process using a substoichiometric amount of water based on hydrolysable groups present.

11. The process of claim 1, wherein the consolidant is present as at least one of a solution and an emulsion.

12. The process of claim 1, wherein the curing of the consolidant is carried out under hydrothermal conditions.

13. A hydrolysis-stable molded article which is obtainable by the process of claim 1.

14. The process of claim 1, wherein the at least one of a hydrolyzate and a precondensate has been prepared by hydrolysis and at least partial condensation of the compounds of formulae (I) to (III) with water in the presence of an acidic or basic catalyst.

15. The process of claim 14, wherein the hydrolysis and at least partial condensation is carried out at a pH of from 1 to 3.

16. The process of claim 1, wherein the consolidant is present as a sol.

17. The process of claim 1, wherein before use the consolidant is activated by adding water thereto.

18. The process of claim 1, wherein a material which is at least particulate is mixed with the consolidant.

19. A process for the production of a hydrolysis-stable coating, wherein the process comprises applying to a substrate a coating material and curing the coating material at a temperature of at least 40° C. and a pressure of at least 5 bar, the coating material being particle-free and comprising at least one of a hydrolyzate and a precondensate of (a) at least one organosilane of formula $$R_nSiX_{4-n} \quad (I)$$

wherein the radicals R are the same or different and represent groups which are not removable by hydrolysis, the radicals X are the same or different and represent hydroxy groups and groups which are removable by hydrolysis, and n is 1, 2 or 3;

(b) at least one hydrolysable silane of formula $$SiX_4 \quad (II)$$

wherein the radicals X are as defined above; and
(c) at least one metal compound of formula $$MX_a \quad (III)$$

wherein M represents a metal of main groups I to VIII or of transition groups II to VIII of the Periodic System of Elements, including boron, X is as defined above in formula (I), with the proviso that two radicals X may be replaced by one oxo group, and a corresponds to a valency of the metal M;

a molar ratio of compounds of formulae (I) and (II) to compound(s) of formula (III) being from 10,000:1 to 10:1.

* * * * *